United States Patent
Bahrami et al.

(10) Patent No.: US 11,327,722 B1
(45) Date of Patent: May 10, 2022

(54) PROGRAMMING LANGUAGE CORPUS GENERATION

(71) Applicant: FUJITSU LIMITED, Kawasaki (JP)

(72) Inventors: Mehdi Bahrami, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/116,956

(22) Filed: Dec. 9, 2020

(51) Int. Cl.
G06F 8/30 (2018.01)
G06F 11/36 (2006.01)
G06F 16/23 (2019.01)
G06N 20/00 (2019.01)
G06N 5/04 (2006.01)
G06F 8/71 (2018.01)

(52) U.S. Cl.
CPC ............. *G06F 8/311* (2013.01); *G06F 8/71* (2013.01); *G06F 11/3624* (2013.01); *G06F 16/2379* (2019.01); *G06N 5/04* (2013.01); *G06N 20/00* (2019.01)

(58) Field of Classification Search
CPC ...................................................... G06F 8/30
See application file for complete search history.

(56) References Cited

U.S. PATENT DOCUMENTS

| | | | |
|---|---|---|---|
| 10,180,836 B1 * | 1/2019 | Arguelles | G06F 8/73 |
| 2006/0015844 A1 * | 1/2006 | Johnson | G06F 8/36 |
| | | | 717/106 |
| 2008/0127127 A1 * | 5/2008 | Chitgupakar | G06F 8/51 |
| | | | 717/137 |
| 2019/0095186 A1 * | 3/2019 | Jozsa | G06F 8/65 |

OTHER PUBLICATIONS

Karampatsis, "Big Code != Big Vocabulary: Open-Vocabulary Models for Source Code" ICSE'20, May 23, 2020.
Feng, Zhangyin, et al. "Codebert: A pre-trained model for programming and natural languages." arXiv preprint arXiv:2002.08155 (Feb. 2020).
Husain, Hamel, et al. "Codesearchnet challenge: Evaluating the state of semantic code search." arXiv preprint arXiv: 1909.09436 (Sep. 2019).

* cited by examiner

*Primary Examiner* — Jae U Jeon
(74) *Attorney, Agent, or Firm* — Maschoff Brennan (57) ABSTRACT

A method may include obtaining one or more software-repository packages. A programming-language function may be extracted from the one or more software-repository packages. A curation resource associated with the programming-language function may be identified. The curation resource may include descriptive information related to the programming-language function. The method may include generating a code description corresponding to the programming-language function based on the curation resource. A function-comment pair that includes the programming-language function and the generated code description may be determined. A programming language corpus that includes the one or more software-repository packages may be generated and augmented by the function-comment pair. The method may include training a machine learning model using the programming language corpus.

20 Claims, 7 Drawing Sheets

PROGRAMMING LANGUAGE CORPUS GENERATION

The present disclosure generally relates to generation of a programming language corpus.

BACKGROUND

A programming language is a language that includes computer-readable syntax. Statements written in the programming language may provide instructions to a computer such that the computer may interpret and execute the provided instructions to perform tasks. Programming languages include words and phrases that may be grouped together to generate computer-readable expressions and statements. A collection of all valid expressions and statements may define a syntax for a programming language.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining one or more software-repository packages. The method may also include extracting a programming-language function from the one or more software-repository packages. The method may include identifying a curation resource associated with the programming-language function, the curation resource including descriptive information related to the programming-language function. The method may include generating a code description corresponding to the programming-language function based on the curation resource. The method may also include determining a function-comment pair that includes the programming-language function and the generated code description. The method may include generating a programming language corpus that includes the one or more software-repository packages and augmenting the programming language corpus with the function-comment pair. The method may include training a machine learning model using the programming language corpus.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

The embodiments described in the present disclosure may relate to, among other things, generating a programming language corpus for an existing programming language. Such a programming language corpus for a given programming language may include statements and expressions using proper syntax written in the given programming language. Additionally or alternatively, the programming language corpus may include resources that explain usage and syntax of the given programming language. Additionally or alternatively, the programming language corpus may include resources that explain the meaning or semantics of statements and expressions in the programming language corpus.

In some embodiments, a programming language corpus for a given programming language may be used to train a machine learning model. In these and other embodiments, the machine learning model may be trained based on the generated programming language corpus to respond to a natural-language user query (e.g., user query in English or Japanese) requesting code suggestions. Additionally or alternatively, the machine learning model may be trained to return responses or code suggestions including statements written in valid syntax for the given programming language. Additionally or alternatively, the machine learning model may be trained to synthesize responsive code for the given programming language.

Current machine learning models may not provide helpful code suggestions based on user queries. Code suggestions returned by current machine learning models may provide little or no context or explanation indicating how the code suggestions function. A user may not be able to determine whether such code suggestions are most relevant to a user-generated query. Such shortcomings may particularly affect those unfamiliar with or inexperienced with a given programming language.

The present disclosure may, among other things, improve the context of code suggestions returned by a machine learning model trained using a programming language corpus generated according to the present disclosure. For example, the generated programming language corpus may provide descriptions for source code in the programming language corpus based on at least open-source software comments, forum posts discussing the source code, or source-code tutorials. In these and other embodiments, the descriptions provided by the programming language corpus may be included with code suggestions returned by the machine learning model. In these and other embodiments, the machine learning model may return code suggestions along with descriptions and/or instructions of usage based on the programming language corpus.

Certain embodiments of the present disclosure may provide improvements over previous iterations of programming language corpuses and/or machine learning models trained to provide code suggestions based on programming language corpus training data. For example, software development may be improved by configuring a computer system in a manner in which the computing system is able to provide code searching results with more context and better descriptions of the code searching results. As another example, software development may be improved by providing integrated development environments with plug-ins that aid users to develop software applications based on descriptions included in the generated programming language corpus.

Embodiments of the present disclosure are explained with reference to the accompanying figures.

Figure 1:
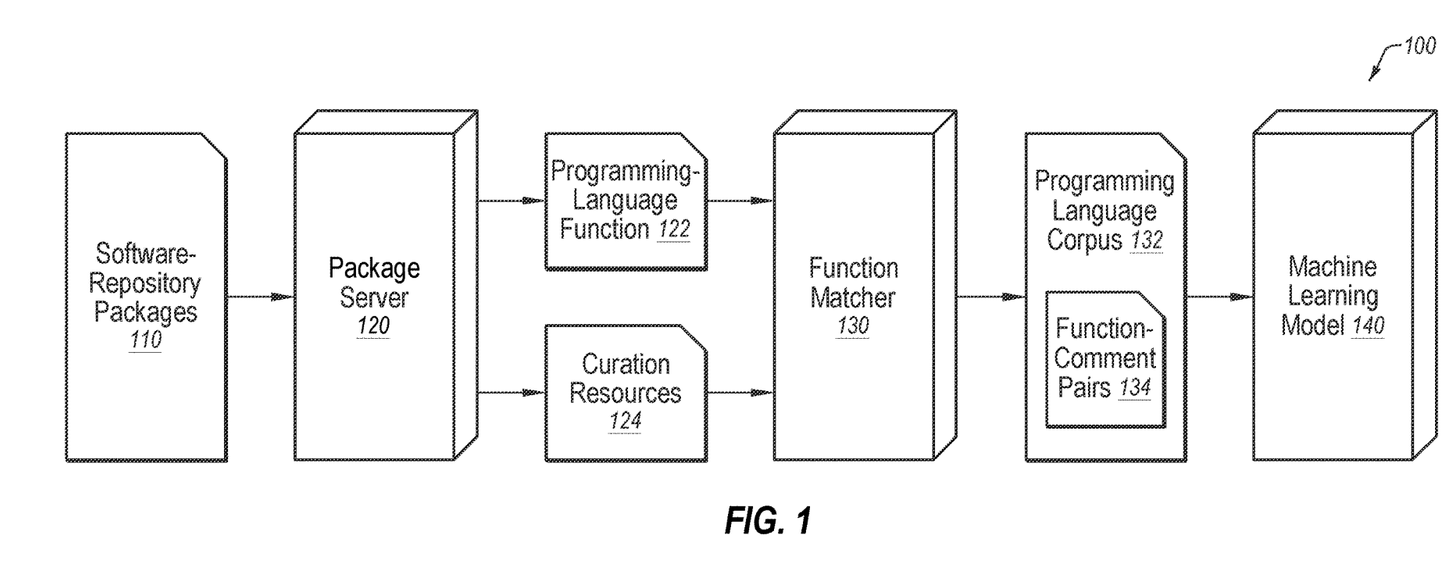
FIG. 1 is a diagram representing an example system related to generating and augmenting a programming language corpus.

FIG. 1 is a diagram of an example system 100 related to generating and augmenting a programming language corpus, in accordance with one or more embodiments of the present disclosure. The system 100 may include a package server 120, a function matcher 130, and a machine learning model 140. The package server 120 may obtain one or more software-repository packages 110 from one or more source-code repositories and output programming-language functions 122 and curation resources 124 based on the obtained software-repository packages 110. The function matcher 130 may obtain the programming-language functions 122 and the curation resources 124. The function matcher 130 may generate function-comment pairs 134 corresponding to the programming-language functions 122 and the curation resources 124, and the function-comment pairs 134 may be included in a programming language corpus 132. The machine learning model 140 may obtain the programming language corpus 132 including the function-comment pairs 134. The programming-language corpus 132 may be used to train the machine learning model 140.

The package server 120 may obtain the one or more software-repository packages 110 from one or more source-code repositories. In some embodiments, the source-code repository may include software and source-code projects written in a specific programming language. For example, a source-code repository, such as the PYTHON Package Index (PyPI) or ANACONDA, may include software and source code written in PYTHON. As another example, a source-code repository, such as the RUBY Application Archive, may include software and source code written in RUBY programming language. In some embodiments, the source-code repository may include software and source code written in two or more programming languages. In some embodiments, one or more programming-language functions 122 may be extracted from the software-repository packages 110. A parser may identify syntax of a given programming language included in the one or more programming-language functions 122. Additionally or alternatively, the parser may extract the programming-language functions 122 based on the identified syntax of the given programming language.

In some embodiments, one or more curation resources 124 may be identified based on the software-repository packages 110. The one or more curation resources 124 may provide descriptions about the purpose and/or the usage of the one or more programming-language functions 122. For example, the curation resources 124 may include software-repository package documentation, source-code usage tutorials, forum discussion, GITHUB commit messages, etc. In some embodiments, the curation resources 124 may be included in the software repositories from which the software-repository packages are obtained. In some embodiments, the curation resources 124 may not be included in the software repositories from which the software-repository packages are obtained and may be provided by third parties. For example, a forum or other message board may be hosted and run by a third party and the forum may include comments, question and answers, and/or other information regarding the operation of the software-repository packages and/or functions included therein.

In operation, the function matcher 130 may obtain the programming language functions 122 and the curation resources 124 from the package server 120. The function matcher 130 may determine function-comment pairs 134 based on the obtained programming-language functions 122 and the curation resources 124. In some embodiments, the function matcher 130 may generate one or more descriptions based on the curation resources 124 and pair the generated one or more descriptions with a corresponding programming-language function. For example, the function matcher 130 may obtain a given programming-language function and a curation resource, such as a code-usage tutorial describing how to use the programming-language function. Continuing the example, the function matcher 130 may generate a description of the given programming-language function in the code-usage tutorial and use the generated description as a code comment relating to the given programming language function. Continuing the example, the function matcher 130 may pair the description from the code-usage tutorial to the given programming language function to determine a function-comment pair corresponding to the given programming language function. One or more function-comment pairs 134 may be included in a programming language corpus 132. In some embodiments, the programming language corpus 132 may represent a list of functions written in a given programming language. In these and other embodiments, the programming language corpus 132 may be a collection of function-comment pairs 134.

The machine learning model 140 may be trained using the programming language corpus 132. In some embodiments, the machine learning model 140 may be trained for software engineering tasks such as code searching, source-code synthesis, and debugging. For example, the machine learning model 140 may find source code responsive to a natural-language search query based on a given programming language corpus used to train the machine learning model 140. Additionally or alternatively, the machine learning model 140 may generate source code responsive to a user request (e.g., "write a program that can read a CSV file and publish it as a web-server") based on the given programming-language corpus used to train the machine learning model 140. Additionally or alternatively, the machine learning model 140 may identify and correct errors in source code provided to the machine learning model 140 and/or suggest source code having less security vulnerabilities or lower computation time based on the given programming language corpus.

Modifications, additions, or omissions may be made to the system 100 without departing from the scope of the disclosure. For example, the designations of different elements in the manner described is meant to help explain concepts described herein and is not limiting. For instance, in some embodiments, the package server 120, the function matcher 130, and the machine learning model 140 are delineated in the specific manner described to help with explaining concepts described herein but such delineation is not meant to be limiting. Further, the system 100 may include any number of other elements or may be implemented within other systems or contexts than those described.

Figure 2:
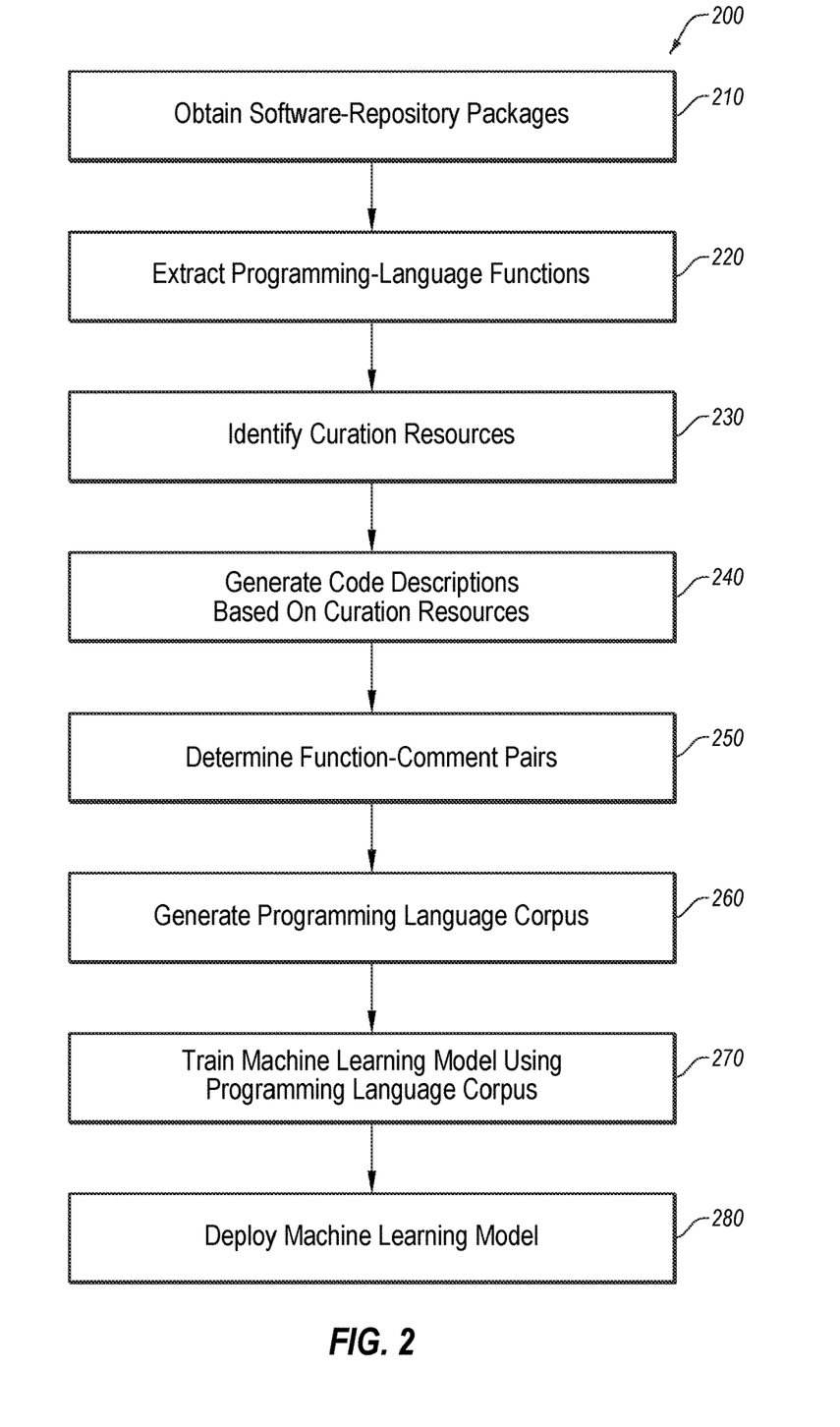
FIG. 2 is a flowchart of an example method of generating and augmenting a programming language corpus.

FIG. 2 is a flowchart of an example method 200 of generating a programming language corpus based on programming language functions and curation resources associated with the programming language functions according to at least one embodiment described in the present disclosure. The method 200 may be performed by any suitable system, apparatus, or device. For example, the system 100, the package server 120, the function matcher 130, and/or the machine learning model 140 may perform one or more of the operations associated with the method 200. Although illustrated with discrete blocks, the steps and operations associated with one or more of the blocks of the method 200 may be divided into additional blocks, combined into fewer blocks, or eliminated, depending on the particular implementation.

At block 210, one or more software-repository packages may be obtained from one or more software repositories. In some embodiments, one or more software-repository packages of source code may be included in a software repository with the one or more software-repository packages being submitted to the software repository by one or more users. In some embodiments, the one or more software-repository packages may be downloaded from the one or more software repositories. For example, the one or more software-repository packages may be identified and downloaded by a web crawler. In these and other embodiments, the software-repository packages may include source code and/or curation resources related to the source code. Additionally or alternatively, curation resources not included in the one or more software repositories related to the obtained packages may be identified and obtained by the web crawler and/or by other approaches. Additionally or alternatively, metadata describing the source code based on the curation resources may be included in the software-repository package. The metadata may include information describing the source code, such as source-code documentation, installer information, license information, and/or natural-language summaries of the source code. In some embodiments, the metadata may facilitate identification of one or more programming-language functions included in the software-repository package. In some embodiments, the source code, programming-language functions, curation resources, and/or metadata identified by the web crawler may be used to augment the one or more software-repository packages. In these and other embodiments, the one or more software-repository packages may be stored in a database. In some embodiments, storage of the software-repository packages in the database may facilitate determining a coverage of a target programming language as described in further detail in relation to FIG. 4.

At block 220, programming-language functions included in the software-repository packages may be extracted. A programming-language function may include a statement written in a given programming language that performs a task as described by the statement when executed by a computer. The programming-language functions may be written based on a syntax defined by the given programming language. In some embodiments, programming-language functions may be identified based on curation resources associated with the source code included in the software-repository packages. For example, obtained source code written in PYTHON may include usage of a "numpy.save" function, but the source code for the "numpy.save" function may be imported from another library, and the software-repository package may or may not include a description of the operation of the function, the inputs/outputs of the function, etc. Curation resources relating to the source code including the "numpy.save" function may include a code comment providing a natural-language description of the "numpy.save" function indicating the purpose of the "numpy.save" function (e.g., save function for an array processing numbers, strings, records, and/or objects to a binary file).

At block 230, curation resources related to the programming-language functions may be identified. In some embodiments, curation resources may be included in the software-repository packages. Additionally or alternatively, curation resources may be provided by third parties. In some embodiments, identifying and obtaining curation resources provided by third parties may be facilitated by a web crawler. In these and other embodiments, descriptions and hyperlinks included in the curation resources found in the software-repository packages or in the source code from which the programming-language functions were identified may provide the web crawler with information regarding where to find third-party curation resources. The curation resource may include at least one of documentation obtained from the software repository, forum discussion posts explaining usage of the programming-language functions, software-usage tutorials, package update logs, or source-code metadata. Documentation obtained from the software repository may include a description of the source code. Additionally or alternatively, the documentation may contain example input values and/or examples of the source code being used. In some embodiments, the documentation may be obtained from the software repository corresponding to the obtained source code. Forum discussion posts and software-usage tutorials may provide additional information regarding usage and implementation of a programming-language function. In some embodiments, forum discussion posts and software-usage tutorials may be included in the software repository from which the source code may be obtained. In some embodiments, forum discussion posts and software-usage tutorials may not be included in the software repository, such curation resources may be identified and obtained in other locations (e.g., STACKOVERFLOW) by the web crawler. In these and other embodiments, forum discussion posts and software-usage tutorials may provide instructions regarding how to validate a programming-language function. Package update logs may provide information not disclosed in the body of the source code included in the package. In some embodiments, the package update logs may indicate a reason explaining why the source code was submitted to the software repository. In these and other embodiments, the package update logs may identify known issues with the source code and patches that fix the known issues. In these and other embodiments, the package update logs may provide explanations or descriptions of the source code not disclosed in the source code itself.

At block 240, one or more code descriptions relating to each of the programming-language functions may be generated based on the curation resources. In some embodiments, the one or more code descriptions may include a natural-language description of the purpose of a given piece of source code or an explanation about the expected inputs and/or outputs of a given function. In some embodiments, the one or more code descriptions may be generated based on code comments included in the source code from which the programming-language functions were extracted. In some embodiments, the one or more code descriptions may be included in the curation resources of the source code from which the programming-language functions were extracted. For example, a software repository may include an introductory webpage relating to a given piece of source code, and the introductory webpage may provide a natural-language description of the given piece of source code. The natural-language description may include an explanation for each programming-language function included in the given piece of source code. The explanation corresponding to a given programming-language function included in the given piece of source code may be designated as a code description relating to the given programming-language function.

At block 250, function-comment pairs may be determined based on the code descriptions identified at block 240. Function-comment pairs may indicate relationships between the code descriptions identified at block 240, the curation resources identified at block 230, and the programming-language functions extracted at block 220. In some embodiments, a given programming-language function and curation resources corresponding to the given programming-language function may be vectorized to determine a function-comment pair. For example, a given programming-language function may be extracted, and curation resources relating to the given programming-language function may also be identified. The curation resources may include a STACK-OVERFLOW forum post discussing what outputs may be expected from the given programming-language function, a third-party tutorial explaining what inputs the given programming-language function accepts, and documentation including a description of the purpose of the given programming-language function. A function-comment pair for the given programming-language function may be a vector representing the given programming-language function, the forum post, the tutorial, and/or the documentation.

At block 260, a programming language corpus may be generated based on the function-comment pairs. For example, a collection of source code written in a given programming language may be combined, merged, etc. to generate and/or supplement the programming language corpus. The programming language corpus may include a collection of source code that provides information regarding the syntax and/or operability of functions written in the given programming language. In these and other embodiments, the programming language corpus may include the one or more function-comment pairs and one or more software-repository packages. In these and other embodiments, the one or more function-comment pairs may relate to source code and/or functions included in the one or more software-repository packages. In some embodiments, inclusion of function-comment pairs in the programming language corpus may be based on successful compilation and/or execution of the programming-language functions included in the function-comment pairs as described in further detail in relation to FIG. 5. In some embodiments, inclusion of software-repository packages in the programming language corpus may be based on a quality of each of the software-repository packages. In these and other embodiments, the quality each of the software-repository packages may be associated with a number of releases in each of the software-repository packages as described in further detail in relation to FIG. 6.

At block 270, a machine learning model may be trained using the programming language corpus. For example, the machine learning model may include a deep learning model, a tree model, etc. that may be trained to identify relationships and/or associations between a programming language and operations/tasks. For example, the machine learning model may include programming-language functions with other programming-language functions included within the programming language corpus that may be combined and/or work together. In these and other embodiments, the machine learning model may be trained to identify code to perform a given task, synthesize code to perform a task, etc.

At block 280, the machine learning model may be deployed, such as for software development purposes. For example, in some embodiments the machine learning model may obtain a search query, and the machine learning model may perform code searching or return source-code suggestions responsive to the search query based on the programming language corpus. As another example, the machine learning model may obtain a query including source code, and the machine learning model may return suggestions for improving the source code or provide descriptions relating to the source code included in the query based on the source code and code descriptions included in the programming language corpus.

Modifications, additions, or omissions may be made to the method 200 without departing from the scope of the disclosure. For example, the designations of different elements in the manner described is meant to help explain concepts described herein and is not limiting. Further, the method 200 may include any number of other elements or may be implemented within other systems or contexts than those described.

Figure 3:
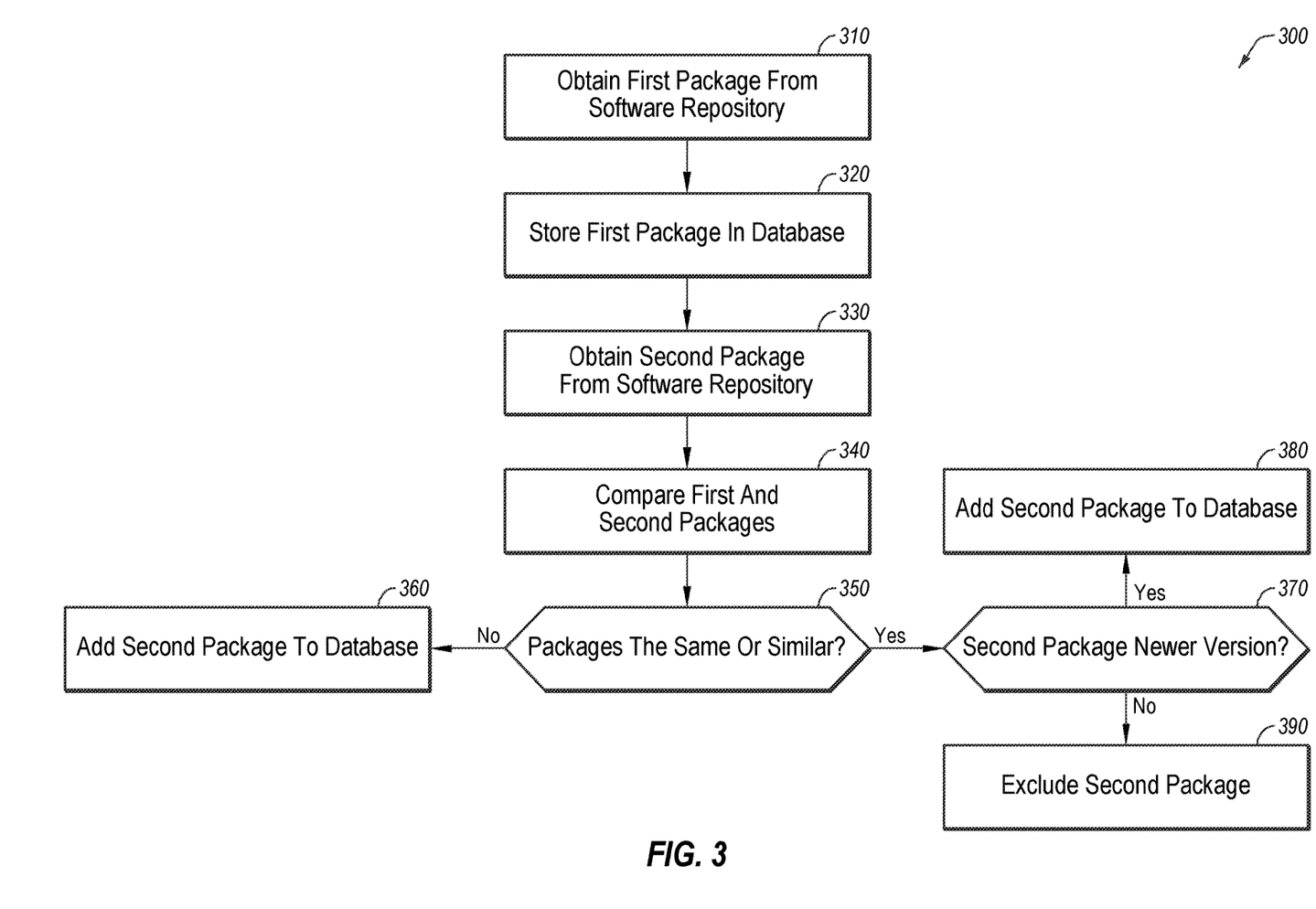
FIG. 3 is a flowchart of an example method of obtaining one or more software repository packages.

FIG. 3 is an example method 300 of updating a version relating to a software-repository package obtained according to at least one embodiment described in the present disclosure. In some embodiments, steps included in the method 300 may be performed as additional steps during the method 200. For example, the method 300 may be performed after obtaining the software-repository packages at block 210 and before extracting the programming-language functions at block 220 and/or identifying the curation resources at block 230. The method 300 may be performed by any suitable system, apparatus, or device. For example, the system 100, the package server 120, the function matcher 130, and/or the machine learning model 140 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 310, a first software-repository package may be obtained. The block 310 may be similar or comparable to the block 210 of FIG. 2.

At block 320, the first software-repository package may be stored in a database. Additionally or alternatively, information about the first software-repository package such as curation resources corresponding to the first software-repository package, may be stored in the database with the first software-repository package. Information relating to the first software-repository package may include a package specification detailing at least one of the purpose, technical requirements, or usage instructions of the first software-repository package. In some embodiments, the package specification may include curation resources included in the first software-repository package. In these and other embodiments, the package specification may include a version label for the first software-repository package. The version label may document when the first software-repository package was uploaded to the software repository. Additionally or alternatively, the version label may document when the first software-repository package was developed. In these and other embodiments, the version label may be represented by an alphanumerical symbol, such as 1.0, 2.0.3, 2.A, or B.

At block 330, a second software-repository package may be obtained. The second software-repository package may be obtained in the same or a similar manner as the software-repository package described in relation to block 210 of method 200 is obtained. In some embodiments, the second software-repository package may be obtained from the same software repository as the first software-repository package or a software repository different from the software repository from which the first software-repository package is obtained. Additionally or alternatively, information relating to the second software-repository package may be obtained. In some embodiments, the information relating to the second software-repository package may include a package specification and/or a version label for the second software-repository package.

At block 340, the second software-repository package may be compared to the first software-repository package. The second software-repository package and the first software-repository package may be compared to determine whether the software-repository packages are the same or similar based on source code included in each of the software-repository packages. In some embodiments, the second software-repository package and the first software-repository package may be compared based on similarities between programming-language functions included in the software-repository packages. For example, a first software-repository package may include a first, a second, and a third programming-language function, and a second software-repository package may include the same first, the same second, and the same third programming-language function. The first software-repository package and the second software-repository package may be considered the same or similar based on the first, the second, and the third programming-language functions being the same even if differences exist in the source code used to implement the programming-language functions.

Additionally or alternatively, the second software-repository package and the first software-repository package may be compared based on a package specification associated with each of the software-repository packages. In these and other embodiments, comparing the software-repository packages based on the package specification associated with each software-repository package may be based on any information included in the package specifications. Comparing the software-repository packages based on the package specification associated with each software-repository package may, for example, depend on a username associated with an upload of each software-repository package and technical instructions associated with each software-repository package. For example, a third software-repository package and a fourth software-repository package may be uploaded under the same username, but the technical instructions for using the third software-repository package may be different from the technical instructions for using the fourth software-repository package. In this example, the comparison between the third software-repository package and the fourth software-repository package may indicate the software-repository packages are different and/or not the same.

At block 350, a determination may be made whether the first software-repository package and the second software-repository package are the same or similar based on the comparison performed at block 340. If the packages are not the same/similar, the method 300 may proceed to the block 360. If the packages are the same/similar, the method 300 may proceed to the block 370.

At block 360, the second software-repository package may be stored in the database. Storing the second software-repository package in the database may be accomplished by the same or a similar process as storing the first software-repository package in the database as described in relation to block 320.

At block 370, a determination may be made whether the second software-repository package is a newer version of the first software-repository package. In some embodiments, determining whether the second software-repository package is a newer version of the first software-repository package may depend on a version label associated with each software-repository package. Additionally or alternatively, determining which software-repository package is the newer version may depend on the date each software-repository package was uploaded to the software repository. In some embodiments, determining whether the second software-repository package is the newer version may depend on descriptions of the version label. In these and other embodiments, such descriptions of the version label may be found in the package specification associated with each software-repository package or in the source code itself as comments. For example, a given first software-repository package may have a first version label of 1.0, and a given second software-repository package may have a second version label of 1.2. A package specification associated with the given second software-repository package may include a description of updates to the source code included in the second software-repository package made between version 1.0 and version 1.2. Continuing the example, the given second software-repository package may be determined to be a newer version of the given first software-repository package. If it is determined that the second software-repository package is a newer version of the first software-repository package, the method 300 may proceed to the block 380. If it is determined that the second software-repository package is not a newer version of the first software-repository package, the method 300 may proceed to the block 390.

At block 380, the second software-repository package may be stored in the database. Storing the second software-repository package in the database may be accomplished by the same or a similar process as storing the first software-repository package in the database as described in relation to block 320. In some embodiments, responsive to determining the second software-repository package is the newer version of the first software-repository package, the first software-repository package may be removed from the database. Additionally or alternatively, the first software-repository package may remain in the database, and the package specification and/or associated with the first software-repository package may be updated to reflect the package specification and/or source code associated with the second software-repository package.

At block 390, the second software-repository package may be excluded from being stored in the database. Additionally or alternatively, any package specifications, version labels, or source code relating to the second software-repository package may be excluded from being stored in the database. In some embodiments, the second software-repository package may be included on a do-not-consider list such that software-repository packages that are the same or similar to the second software-repository package will not be obtained from the software repository. In some embodiments, the block 390 may include discarding and/or expunging the software-repository package from any storage locations.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
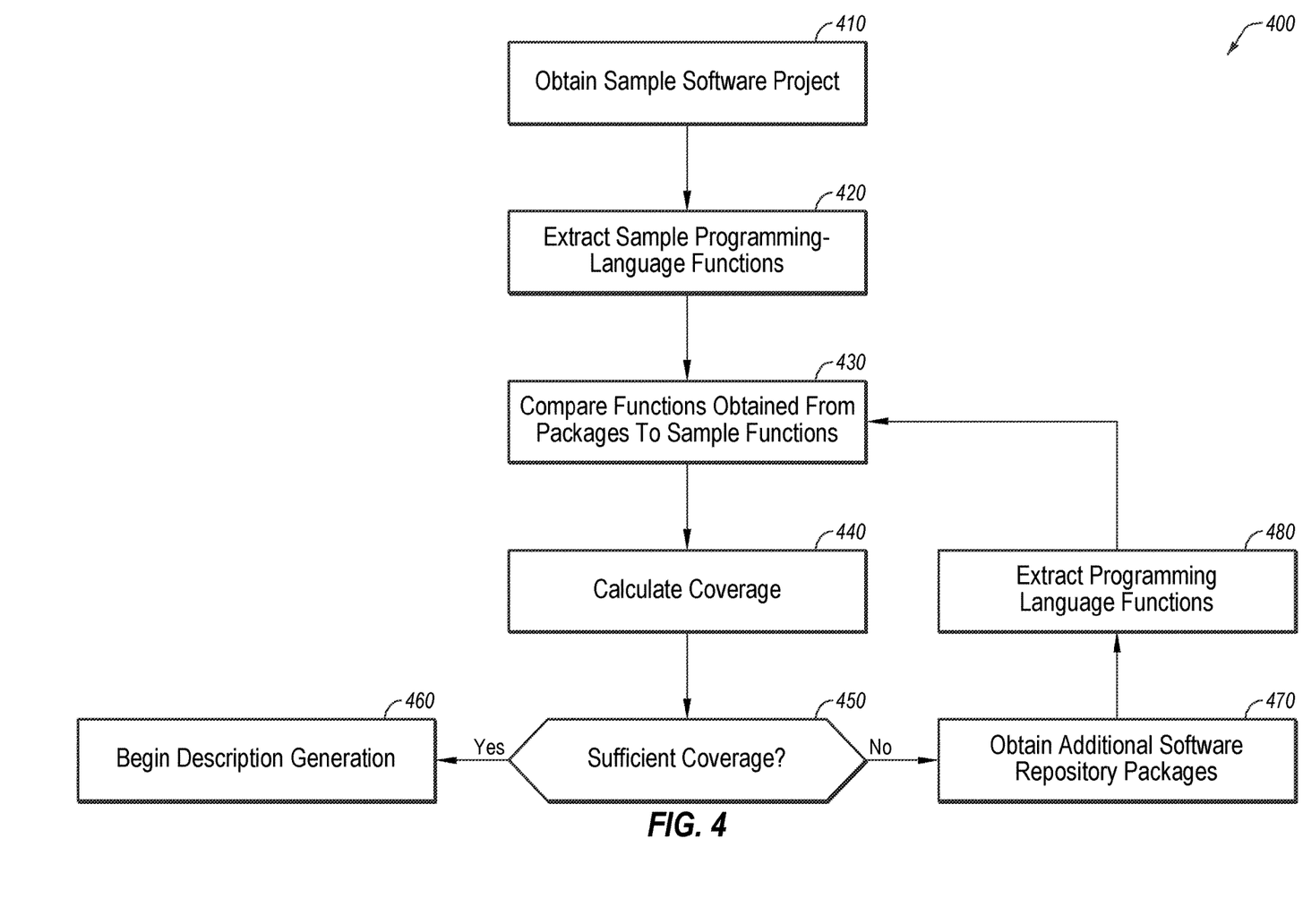
FIG. 4 is a flowchart of an example method of determining a coverage of a programming language corpus.

FIG. 4 is an example method 400 of determining a coverage of the obtained programming-language functions, the coverage indicating how much of a target programming language is included in the obtained programming-language functions, according to at least one embodiment described in the present disclosure. In some embodiments, the steps of method 400 may be performed as additional and/or alternative steps during the method 200. For example, the method 400 may be performed after extracting the programming-language functions at block 220 and/or identifying the curation resources at block 230 and before identifying code descriptions based on the curation resources at block 240. As another example, the method 400 may be performed after generating function-comment pairs at block 250 and before generating the programming language corpus at block 260. The method 400 may be performed by any suitable system, apparatus, or device. For example, the system 100, the package server 120, the function matcher 130, and/or the machine learning model 140 may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

At block 410, one or more sample software projects may be obtained. In some embodiments, the one or more sample software projects may be randomly selected from any location in which software projects may be stored (e.g., from an open-source library containing source code of a given programming language, such as GITHUB). In some embodiments, selection of the sample software projects to be obtained may be determined by a user. In these and other embodiments, the user may select sample software projects based on a popularity of the software project (e.g., selecting trending software projects from GITHUB).

At block 420, sample programming-language functions may be extracted from the one or more sample software projects. In some embodiments, the sample programming-language functions may be extracted by using an abstract syntax tree (AST). The AST may facilitate extraction of sample programming-language functions by parsing source code included in the sample software projects. The output of the AST may include one or more tree diagrams with each tree diagram representative of a given sample software project. In these and other embodiments, each tree diagram may include one or more nodes representing variables and/or operations present in the sample software project. Additionally or alternatively, each tree diagram may include one or more edges connecting the nodes, the edges representing relationships between the connected nodes. The sample programming-language functions and/or inputs and/or outputs associated with the programming-language functions included in a given sample software project may be extracted based on the AST output associated with each of the sample software projects.

At block 430, the programming-language functions extracted from one or more software-repository packages (such as those extracted at the block 220 of FIG. 2) may be compared to the sample programming-language functions. In some embodiments, comparing the programming-language functions to the sample programming-language functions may include comparing function names of the sample programming-language functions to corresponding function names of programming-language functions from the software-repository packages. In these and other embodiments, a given programming-language function and a given sample programming-language function may be considered the same or similar responsive to the function names associated with each function being the same or similar. For example, a given sample programming-language function and a given programming-language function may be considered the same or similar because both functions may have the function name, "numpy.save" and the same or similar source-code implementation. Additionally or alternatively, the given programming-language function and the given sample programming-language function may be considered the same or similar based on a code description associated with the given programming-language function. For example, a given sample programming-language function and a given programming-language function may be considered the same or similar because both functions have the function name, "numpy," and the given programming-language function may include a code description describing the purpose and functionality of the "numpy.save" function as well as similar code.

At block 440, a coverage value may be calculated based on the comparison between the sample programming-language functions and the programming-language functions extracted from the one or more software-repository packages. In some embodiments, the coverage value may be a numerical value representing how many sample programming-language functions are covered by the programming-language functions obtained from the software-repository packages. In these and other embodiments, the coverage value, C, given a number of obtained software-repository packages, $P_e$, a number of sample software projects, $P_t$, and a total number of processed source code, N, may be calculated according to the following mathematical formula:

$$C = \frac{\Sigma \frac{P_e}{P_i}}{N}$$

At block 450, a determination may be made whether the programming-language functions provide sufficient coverage based on the coverage value. In some embodiments, the coverage value may be compared to a threshold coverage value to determine whether the programming-language functions provide sufficient coverage. In these and other embodiments, the threshold coverage value may be determined by a user. Additionally or alternatively, the threshold coverage value may be determined by a statistical evaluation approach based on currently available sample software projects (e.g., the threshold coverage value may be set to a value, N, such that the top one hundred open-source projects trending on GITHUB may be selected as sample software projects for comparison). The calculated coverage value may be compared to the threshold coverage value, $C_T$, according to the following mathematical formula to determine whether the obtained software-repository packages sufficiently cover a target programming language:

$$C \geq C_T$$

If the programming-language functions are determined to provide sufficient coverage, the method 400 may proceed to the block 460. If the programming-language functions are determined not to provide sufficient coverage, the method 400 may proceed to the block 470.

At block 460, generation of code descriptions and determination of function-comment pairs may begin. For example, generation of code descriptions may occur in a similar or comparable manner to that described in relation to block 240 of method 200, and determination of function-comment pairs may occur in a similar or comparable manner to that described in relation to block 250 of method 200.

At block 470, additional software-repository packages may be obtained. Obtaining additional software-repository packages may occur in the same or a similar manner as obtaining software-repository packages as described above in relation to block 210 of method 200.

At block 480, additional programming-language functions may be extracted from the additional software-repository packages. Extraction of the additional programming-language functions may occur in the same or a similar manner as extracting programming-language functions as described above in relation to block 220 of method 200. In some embodiments, after extracting additional software-repository packages, the method 400 may return to the block 430 such that the comparison at block 430 may be augmented by the additional programming-language functions extracted at block 480. Such an augmentation may result in the calculation of the coverage value at block 440 resulting in a different coverage value. The steps described at blocks 430, 440, 450, 470, and 480 of the method 400 may be repeated until a sufficient coverage of the sample programming-language functions is achieved such that the method 400 may proceed to the description-generation step described at block 460.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
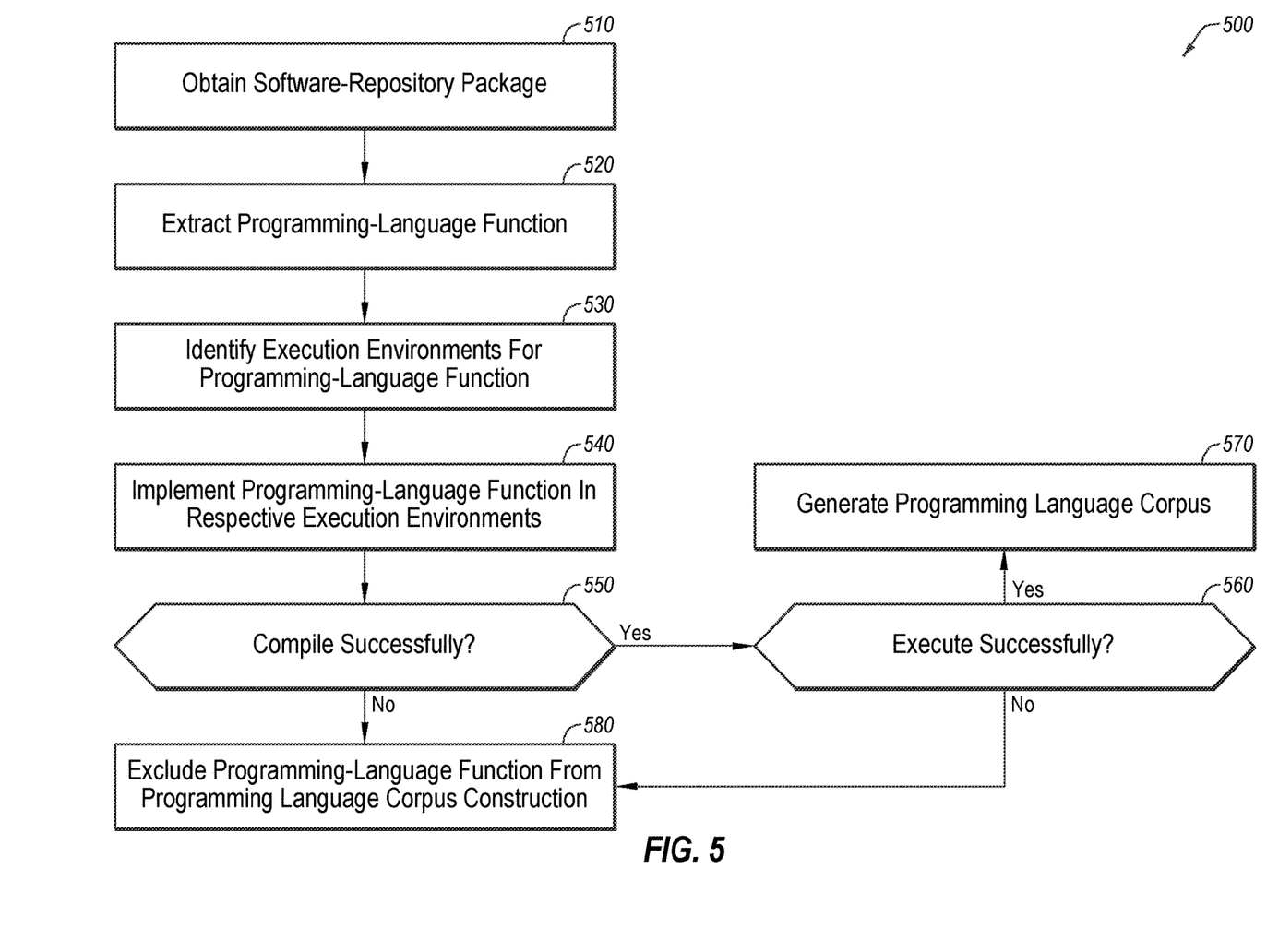
FIG. 5 is a flowchart of an example method of filtering one or more software repository packages to generate a programming language corpus based on verifying compilation and/or execution of one or more programming language functions.

FIG. 5 is an example method 500 of verifying successful compilation and execution of programming-language functions according to at least one embodiment described in the present disclosure. In some embodiments, the steps of method 500 may be performed as additional steps during the method 200. For example, the method 500 may be performed after generating the function-comment pairs at block 250 and before generating the programming language corpus at block 260. The method 500 may be performed by any suitable system, apparatus, or device. For example, the system 100, the package server 120, the function matcher 130, and/or the machine learning model 140 may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

At block 510, a software-repository package may be obtained. The software-repository package may be obtained in the same or a similar manner as the software-repository package described in relation to block 210 of method 200.

At block 520, a programming-language function may be extracted from the software-repository package obtained at block 510. The programming-language function may be extracted in the same or a similar manner as the programming-language function described in relation to block 220 of method 200.

At block 530, an execution environment in which the programming-language function may be compiled and/or executed may be identified. In some embodiments, one or more curation resources associated with the programming-language function may indicate an execution environment in which the programming-language function may be compiled and/or executed. In these and other embodiments, more than one execution environment may be identified based on the one or more curation resources.

At block 540, the programming-language function may be implemented in the identified execution environment. In some embodiments, a virtual environment may be created to test compilation and execution of the programming-language functions based on the execution environment identified at block 530. For example, a given curation resource associated with a given programming-language function may be software documentation included in the software-repository package from which the given programming-language function is extracted. The software documentation may indicate that the given programming-language function is written for a given version of the programming language (e.g., the given programming-language function was written for PYTHON 3.8.0). A given virtual environment may be created such that compilation and execution of the given programming-language function may be tested in PYTHON version 3.8.0.

At block 550, a determination may be made whether the programming-language function is able to successfully compile in a given execution environment. In some embodiments, to determine whether the programming-language function can compile successfully, a compiler included in the virtual environment may analyze source code associated with the programming-language function for syntactical or semantic errors. The compiler may identify syntactical or semantic errors based on the programming language in which the source code is written, and the absence of syntactical or semantic errors may indicate successful compilation of the programming-language function. If the programming-language function is able to compile successfully, the method 500 may proceed to the block 560. If the programming-language function is not able to compile successfully, the method 500 may proceed to the block 580.

At block 560, a determination may be made whether the programming-language function is able to successfully execute in the execution environment. In some embodiments, the determinations of the blocks 550 and/or 560 may be based on the running of the programming-language functions at block 540. In some embodiments, responsive to determining the programming-language function successfully compiles in the virtual environment, a code description associated with the programming-language function may be generated indicating the programming-language function successfully compiled. Additionally or alternatively, responsive to determining the programming-language function successfully executed in the virtual environment, a code description associated with the programming-language function may be generated indicating the programming-language function successfully executed in the identified execution environment.

In some embodiments, to determine whether the programming-language function can execute successfully, an interpreter included in the virtual environment may attempt to run the source code associated with the programming-language function, and the source code running in the given execution environment with no errors may indicate successful execution of the programming-language function within the given execution environment. In some embodiments, the code descriptions indicating successful compilation and/or execution of the programming-language function may be included in the source code as code comments from which the programming-language function was determined. For example, a given code description indicating successful compilation and/or execution of a given programming-language function named "numpy.save" that is written in PYTHON may state "save function compiled and executed successfully in JUPYTER or any other environment using PYTHON version 3.8.0." As another example, a given code description may indicate successful compilation but failed execution of a given programming-language function named "scipy.ndimage.rotate." The given programming-language function may have compiled successfully, but execution of "scipy.ndimage.rotate" may have failed because the given programming-language function did not have access to correct input values and/or a valid execution environment. The given code description may state "rotate function compiled successfully using PYTHON version 3.8.0 but failed to execute due to invalid input values."

If the programming-language function is able to execute successfully, the method 500 may proceed to the block 570. If the programming-language function is not able to execute successfully, the method 500 may proceed to the block 580.

At block 570, a programming language corpus including the programming-language function implemented in the execution environment may be generated. The programming language corpus may be generated in a similar or comparable manner to that described with reference to block 260 of method 200. In some embodiments, successful compilation and/or successful execution of the programming-language function may be included as a curation resource. In these and other embodiments, the code description indicating successful compilation and/or execution of the programming-language function may be such a curation resource. In some embodiments, the curation resource relating to successful compilation and/or successful execution may be vectorized and included in a function-comment pair relating to the programming-language.

At block 580, the programming-language function may be excluded from the programming language corpus. In some embodiments, a programming-language function that successfully compiles but fails to execute in the execution environment may be included in the programming language corpus. In these and other embodiments, the successful compilation but failed execution of the programming-language function may be included in a function-comment pair relating to the programming-language function.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
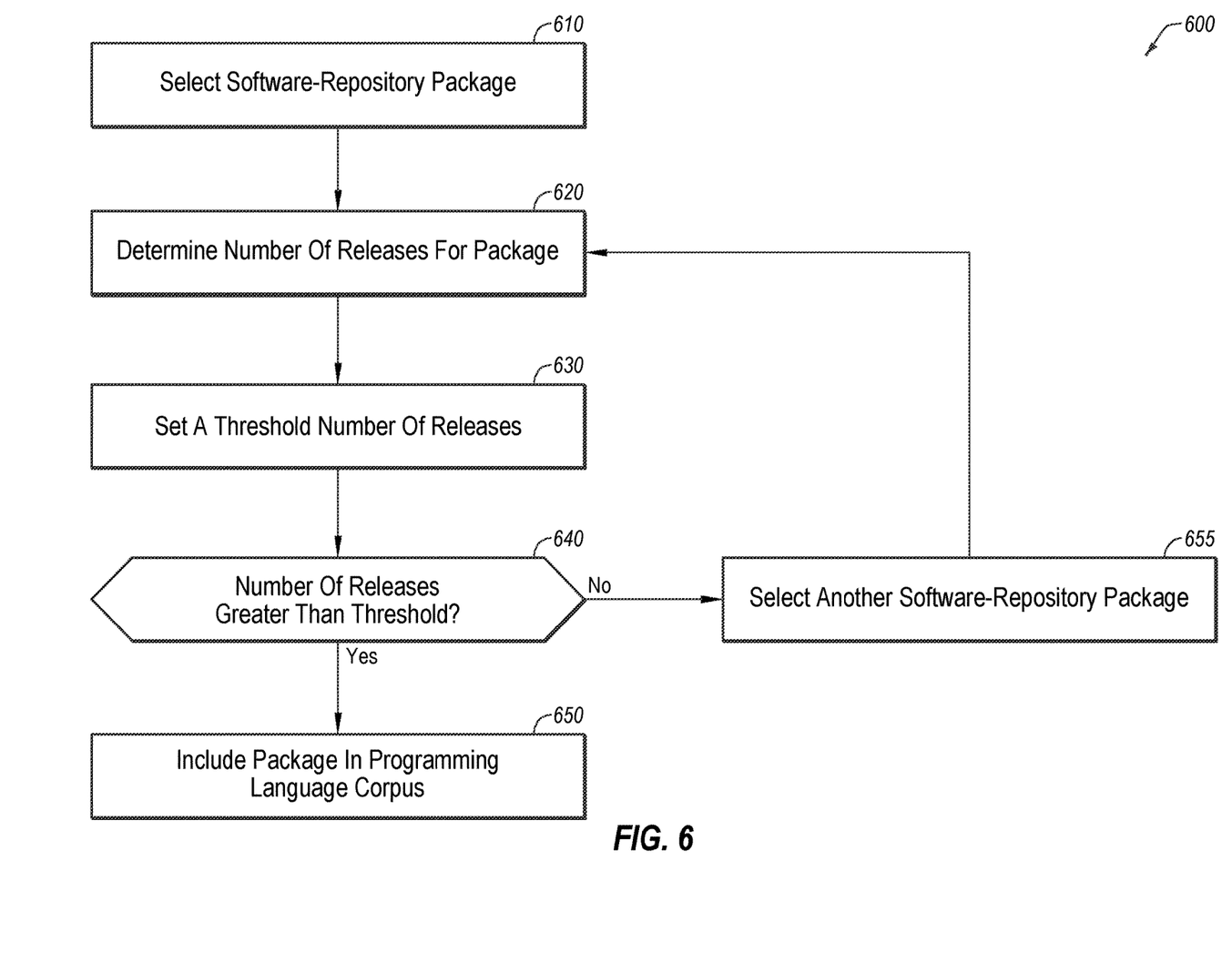
FIG. 6 is a flowchart of an example method of filtering one or more software repository packages to generate a programming language corpus based on a threshold number of releases.

FIG. 6 is an example method 600 of filtering one or more software-repository packages included in a generated programming language corpus based on a number of releases included in each of the software-repository packages according to at least one embodiment described in the present disclosure. In some embodiments, the steps of method 600 may be performed as additional and/or alternative steps during the method 200. For example, the method 600 may be performed after generating the function-comment pairs at block 250 and/or before generating the programming language corpus at block 260. The method 600 may be performed by any suitable system, apparatus, or device. For example, the system 100, the package server 120, the function matcher 130, and/or the machine learning model 140 may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

At block 610, one or more software-repository packages may be selected. In some embodiments, selection of the software-repository packages may be a random sampling of one or more software-repository packages based on the obtained software-repository packages at block 210 of method 200. In some embodiments, a user may select the one or more software-repository packages from the obtained software-repository packages, or any other ordering algorithm or selection process may be used to identify a given software-repository package of a set of software-repository packages.

At block 620, a number of releases included in the selected software-repository package may be determined. In some embodiments, the number of releases included in a software-repository package may be a proxy and/or be correlated with the quality or completeness of a software project included in the software-repository package (e.g., a software-repository package with a greater number of releases may indicate higher quality or more completeness of the software-repository project). Additionally or alternatively, a greater number of releases included in a software-repository package may indicate the software-repository package is likely to be updated frequently and correspondingly may be able to be implemented on the most current version of a programming language. In some embodiments, the number of releases in a given software-repository package may be associated with the number of files in the given software-repository package. Additionally or alternatively, the number of releases may be determined based on information provided in curation resources associated with the software-repository package, such as a version number, previous version numbers, etc. In these and other embodiments, the number of releases in the software-repository package may be recorded in the software documentation associated with the software-repository package.

At block 630, a threshold number of releases may be set. For example, setting the threshold number of releases may act as a filter for the software-repository packages. For example, an intended use of a given programming language corpus may be generating a source-code library to train a machine learning model to provide source-code suggestions based on received search queries. The given programming language corpus may be generated using a wide variety of software-repository packages because any unique pieces of source code may be included in the source-code library. In an example use case, a threshold number of releases may be set to zero, which indicates all obtained software-repository packages may be considered in generating the given programming language corpus. Additionally or alternatively, in another example use case for a second given programming language corpus, the second given programming language corpus may be selected and/or configured to provide code-improvement suggestions or to facilitate debugging source code provided to the machine learning model. Higher quality source code (e.g., source code known to compile and execute successfully or source code documented as having low execution times) may be preferred for generating the second given programming language corpus based on this intended use. In such a use case, a threshold number of releases may be set to a higher number (e.g., five), which may filter for software-repository packages that include five or more projects in generating the second given programming language corpus.

At block 640, a determination may be made whether the number of releases for the selected software-repository package is greater than or equal to the threshold number of releases. If the number of releases is greater than or equal to the threshold, the method 600 may proceed to the block 650. If the number of releases is less than the threshold, the method 600 may proceed to the block 655.

At block 650, the software-repository package may be included in the programming language corpus. Inclusion of the software-repository package in the programming language corpus may occur in the same or a similar manner as generating a programming language corpus as described above in relation to block 260 of method 200.

At block 655, another software-repository package may be selected for consideration, and the method 600 may return to the block 620 to analyze the other software repository-package. Additionally or alternatively, the software-repository package determined at the block 640 to have a number of releases below the threshold may be excluded from consideration in the generation of the programming language corpus. In some embodiments, various operations of the method 600, such as the blocks 620, 630, 640, 650, and/or 655 may be repeated for multiple obtained software-repository package. For example, the operations may be repeated until all of the software-repository packages have been analyzed, until a set number have been analyzed, and/or until some other metric or threshold is reached.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Figure 7:
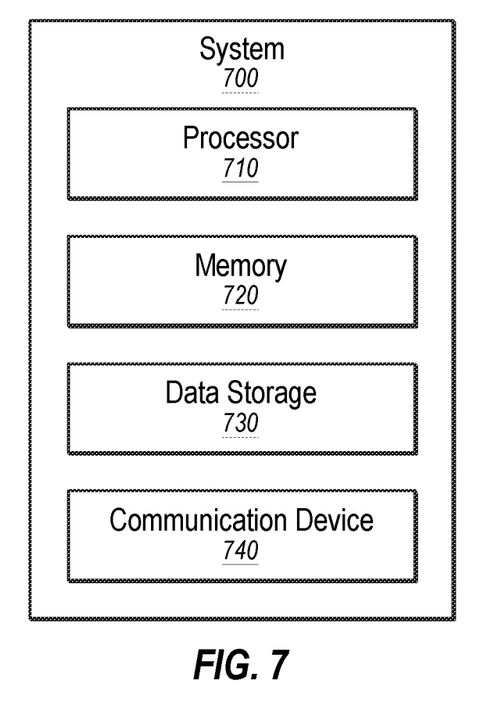
FIG. 7 is an example computing system.

FIG. 7 illustrates an example computing system 700, according to at least one embodiment described in the present disclosure. The computing system 700 may include a processor 710, a memory 720, a data storage 730, and/or a communication unit 740, which all may be communicatively coupled. Any or all of the system 100 of FIG. 1 may be implemented as a computing system consistent with the computing system 700, including the package server 120, the function matcher 130, and/or the machine learning model 140.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform any of the methods 200, 300, 400, 500, and/or 600 of FIGS. 2, 3, 4, 5 and 6, respectively. For example, the processor 710 may obtain instructions regarding obtaining software-repository packages, extracting programming-language functions from the software-repository packages, identifying curation resources, generating code descriptions based on the curation resources, determining function-comment pairs, and/or generating a programming language corpus.

The memory 720 and the data storage 730 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710. For example, the memory 720 and/or the data storage 730 may store obtained software-repository packages as described in relation to block 320 in FIG. 3. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method, comprising:
    obtaining one or more software-repository packages;
    extracting a programming-language function from the one or more software-repository packages;
    identifying a curation resource associated with the one or more software-repository packages, the curation resource including descriptive information related to the programming-language function;
    generating a code description corresponding to the programming-language function based on the curation resource;
    determining a function-comment pair that includes the programming-language function and the code description;
    generating a programming language corpus that includes the one or more software-repository packages augmented with the function-comment pair; and
    training a machine learning model using the programming language corpus.

2. The method of claim 1, further comprising performing at least one of:
    performing a code search responsive to a request for source code, results of the code search determined by the trained machine learning model;
    synthesizing new source code responsive to the request for source code, the new source code synthesized using the machine learning model; and
    debugging source code given to the trained machine learning model.

3. The method of claim 1, further comprising obtaining the curation resource from a source other than a software repository from which the one or more software-repository packages are obtained.

4. The method of claim 1, wherein obtaining the one or more software-repository packages comprises:
    obtaining a first software-repository package;
    storing the first software-repository package in a database;
    obtaining a second software-repository package;
    comparing the second software-repository package to the first software-repository package in the database to determine whether the second software-repository package is stored in the database; and
    based on the second software-repository package not being stored in the database, storing the second software-repository package in the database.

5. The method of claim 1, wherein obtaining the one or more software-repository packages comprises:
    obtaining a first software-repository package;
    storing the first software-repository package in a database;
    obtaining a second software-repository package;
    comparing the second software-repository package to the first software-repository package in the database to determine whether the second software-repository package is stored in the database;
    based on the second software-repository package being stored in the database, determining whether the second software-repository package is a more recent package version of the first software-repository package in the database; and based on determining the second software-repository package is the more recent package version, storing the second software-repository package in the database.

6. The method of claim 1, wherein the curation resource comprises at least one of software documentation, forum discussion posts relating to the software-repository packages, software usage tutorials, software package update logs, or software package metadata.

7. The method of claim 1, further comprising determining a coverage of the programming language corpus, comprising:

obtaining a sample software project;

extracting one or more sample programming-language functions from the sample software project;

extracting one or more additional programming-language functions from the software-repository packages;

comparing the one or more sample programming-language functions to both the one or more additional programming-language functions and the programming-language function to derive a coverage value for each of the one or more software-repository packages, the coverage value representing a ratio of the one or more sample programming-language functions to the one or more additional programming-language functions and the programming-language function;

comparing the coverage value to a threshold coverage; and based on the coverage value being below the threshold coverage, obtaining one or more new software-repository packages.

8. The method of claim 7, wherein extracting the one or more sample programming-language functions comprises extracting the one or more sample programming-language functions using an abstract syntax tree.

9. The method of claim 1, wherein generating the programming language corpus comprises filtering the one or more software-repository packages, wherein the filtering the one or more software-repository packages comprises:

determining an execution environment for the programming-language function based on the curation resource;

running the programming-language function in the execution environment;

generating one or more curation resources indicating whether the programming-language function successfully compiled and executed in the execution environment; and filtering the one or more software-repository packages based on the execution environment curation resources.

10. The method of claim 1, wherein generating the programming language corpus comprises:

determining a first number of releases corresponding to an accumulation of releases for each of the one or more software-repository packages;

setting a threshold number of releases;

determining a subset of the one or more software-repository packages corresponding to a second number of releases below the threshold number of releases; and generating the programming language corpus based on the subset of the one or more software-repository packages.

11. One or more non-transitory computer-readable storage media configured to store instructions that, in response to being executed by one or more processors, cause a system to perform operations, the operations comprising:

obtaining one or more software-repository packages;

extracting a programming-language function from the one or more software-repository packages;

identifying a curation resource associated with the one or more software-repository packages, the curation resource including descriptive information related to the programming-language function;

generating a code description corresponding to the programming-language function based on the curation resource;

determining a function-comment pair that includes the programming-language function and the code description;

generating a programming language corpus that includes the one or more software-repository packages augmented with the function-comment pair; and training a machine learning model using the programming language corpus.

12. The one or more non-transitory computer-readable storage media of claim 11, the operations further comprising performing at least one of:

performing a code search responsive to a request for source code, results of the code search determined by the trained machine learning model;

synthesizing new source code responsive to the request for source code, the new source code synthesized using the machine learning model; and debugging source code given to the trained machine learning model.

13. The one or more non-transitory computer-readable storage media of claim 11, the operations further comprising obtaining the curation resource from a source other than a software repository from which the one or more software-repository packages are obtained.

14. The one or more non-transitory computer-readable storage media of claim 11, wherein obtaining the one or more software-repository packages comprises:

obtaining a first software-repository package;

storing the first software-repository package in a database;

obtaining a second software-repository package;

comparing the second software-repository package to the first software-repository package in the database to determine whether the second software-repository package is stored in the database; and based on the second software-repository package not being stored in the database, storing the second software-repository package in the database.

15. The one or more non-transitory computer-readable storage media of claim 11, wherein obtaining the one or more software-repository packages comprises:

obtaining a first software-repository package;

storing the first software-repository package in a database;

obtaining a second software-repository package;

comparing the second software-repository package to the first software-repository package in the database to determine whether the second software-repository package is stored in the database;

based on the second software-repository package being stored in the database, determining whether the second software-repository package is a more recent package version of the first software-repository package in the database; and based on determining the second software-repository package is the more recent package version, storing the second software-repository package in the database.

16. The one or more non-transitory computer-readable storage media of claim 11, wherein the curation resource comprises at least one of software documentation, forum discussion posts relating to the software-repository packages, software usage tutorials, software package update logs, or software package metadata.

17. The one or more non-transitory computer-readable storage media of claim 11, the operations further comprising determining a coverage of the programming language corpus, comprising:
   obtaining a sample software project;
   extracting one or more sample programming-language functions from the sample software project;
   extracting one or more additional programming-language functions from the software-repository packages;
   comparing the one or more sample programming-language functions to both the one or more additional programming-language functions and the programming-language function to derive a coverage value for each of the one or more software-repository packages, the coverage value representing a ratio of the one or more sample programming-language functions to the one or more additional programming-language functions and the programming-language function;
   comparing the coverage value to a threshold coverage; and
   based on the coverage value being below the threshold coverage, obtaining one or more new software-repository packages.

18. The one or more non-transitory computer-readable storage media of claim 17, wherein extracting the one or more sample programming-language functions comprises extracting the one or more sample programming-language functions using an abstract syntax tree.

19. The one or more non-transitory computer-readable storage media of claim 11, wherein generating the programming language corpus comprises filtering the one or more software-repository packages, wherein the filtering the one or more software-repository packages comprises:
   determining an execution environment for the programming-language function based on the curation resource;
   running the programming-language function in the execution environment;
   generating one or more curation resources indicating whether the programming-language function successfully compiled and executed in the execution environment; and
   filtering the one or more software-repository packages based on the execution environment curation resources.

20. The one or more non-transitory computer-readable storage media of claim 11, wherein generating the programming language corpus comprises:
   determining a first number of releases corresponding to an accumulation of releases for each of the one or more software-repository packages;
   setting a threshold number of releases;
   determining a subset of the one or more software-repository packages corresponding to a second number of releases below the threshold number of releases; and
   generating the programming language corpus based on the subset of the one or more software-repository packages.

* * * * *